United States Patent [19]

Janssen

[11] 4,298,185
[45] Nov. 3, 1981

[54] FENCING DEVICE

[76] Inventor: Paul H. Janssen, R.R. #1, Stanberry, Mo. 64489

[21] Appl. No.: 146,281

[22] Filed: May 5, 1980

[51] Int. Cl.³ .............................................. E04H 17/02
[52] U.S. Cl. ...................................... 256/41; 254/213
[58] Field of Search ....................... 256/41, 39, 43, 40, 256/37; 254/213, 214, 222

[56] References Cited

U.S. PATENT DOCUMENTS

| | | | |
|---|---|---|---|
| 443,575 | 12/1890 | Haugh | 256/39 |
| 565,616 | 8/1896 | Hadden | 256/39 |
| 565,751 | 8/1896 | Horst | 256/39 |
| 649,651 | 5/1900 | Watson | 256/42 |
| 2,951,720 | 9/1960 | Folz | 403/362 |

Primary Examiner—Andrew V. Kundrat
Attorney, Agent, or Firm—James D. Birkenholz

[57] ABSTRACT

A device for securing one end of fencing material, having a post extending into the ground with its bottom portion having outwardly extending flanges. A wire stretching device including a yoke with a turning rod passing therethrough to which is attached the wiring material comprising the fence, with the turning rod rotated to tighten the fence and a locking device for preventing the rod from counter-rotating. A tensioning device connecting the wire stretching device to the post which has a first and second sleeve with the second sleeve generally disposed within the first sleeve. A resiliant element connected to the second sleeve and adjustably connected to the first sleeve permits the second sleeve to move within the first sleeve. Selectively adjusting the resiliant element the tensioning device maintains the fence at a proper tautness. The device is adaptable to be an electrified fence and to utilize automated equipment in the setting of the posts in the ground.

2 Claims, 12 Drawing Figures

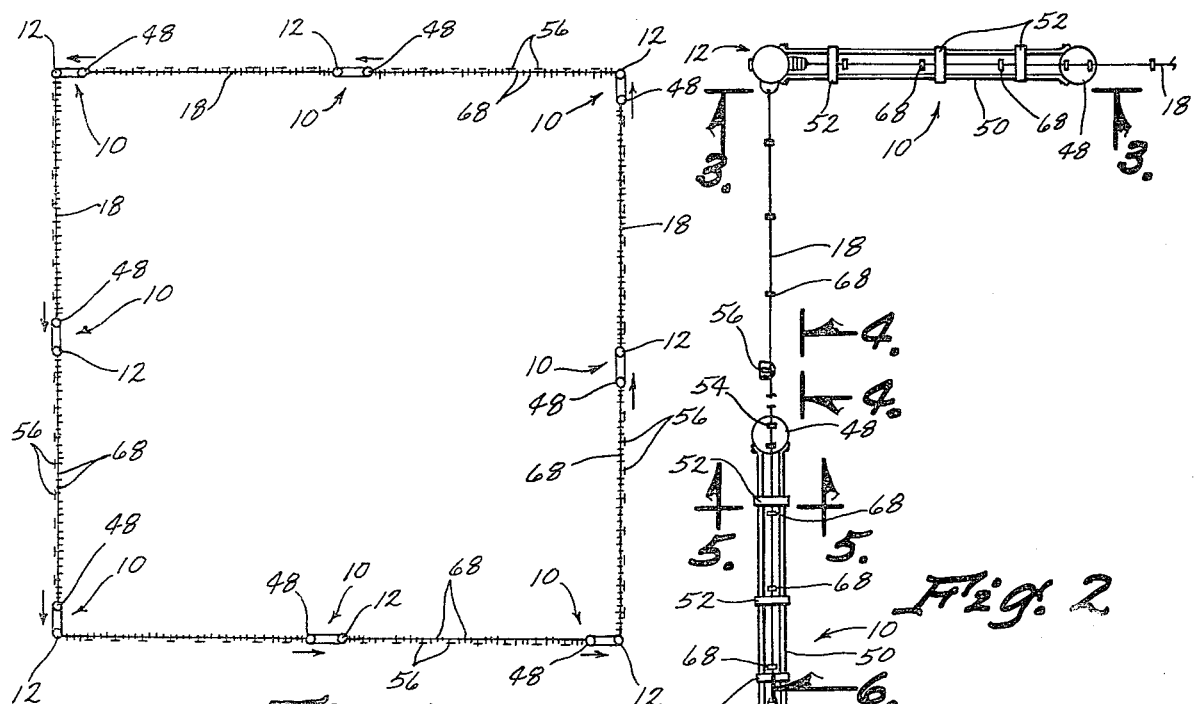
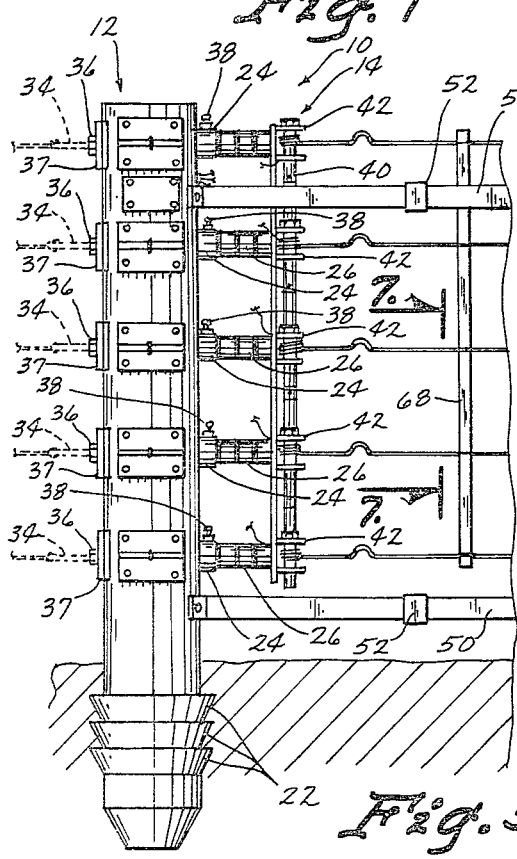
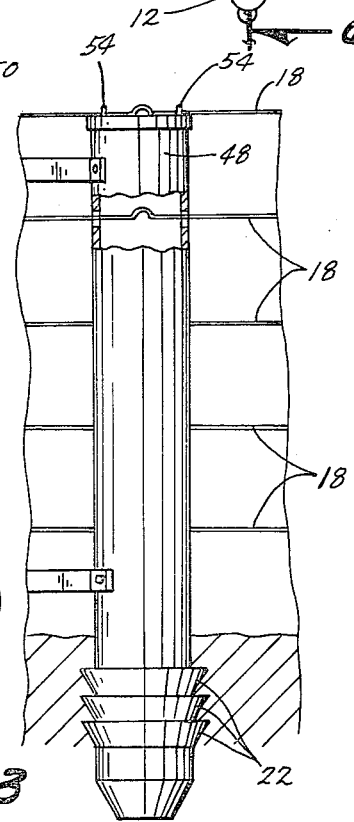
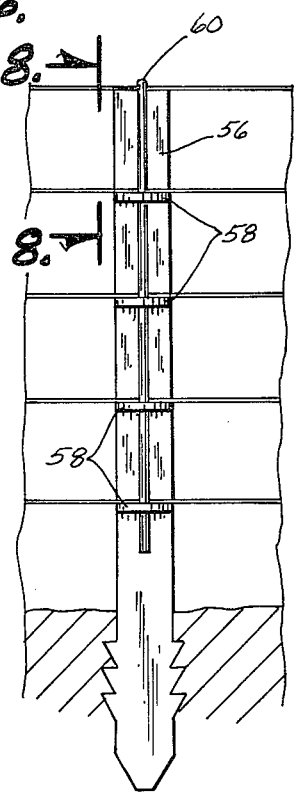
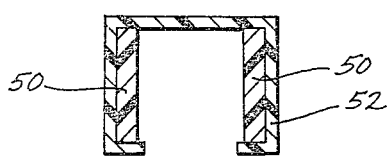

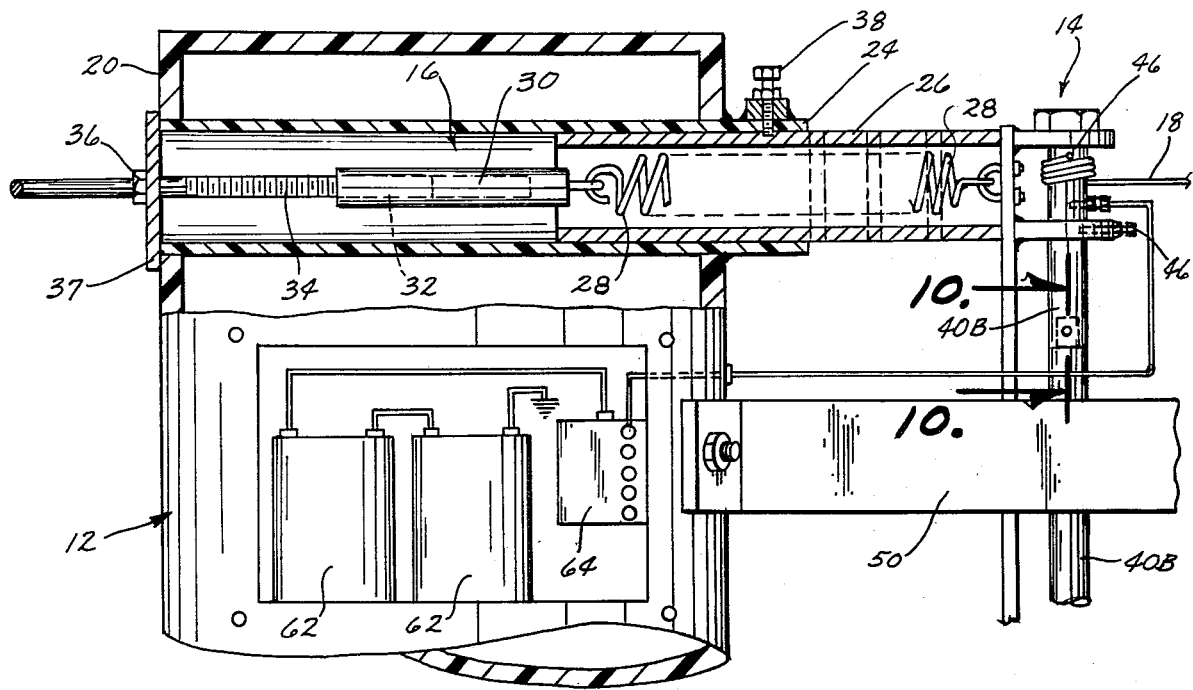
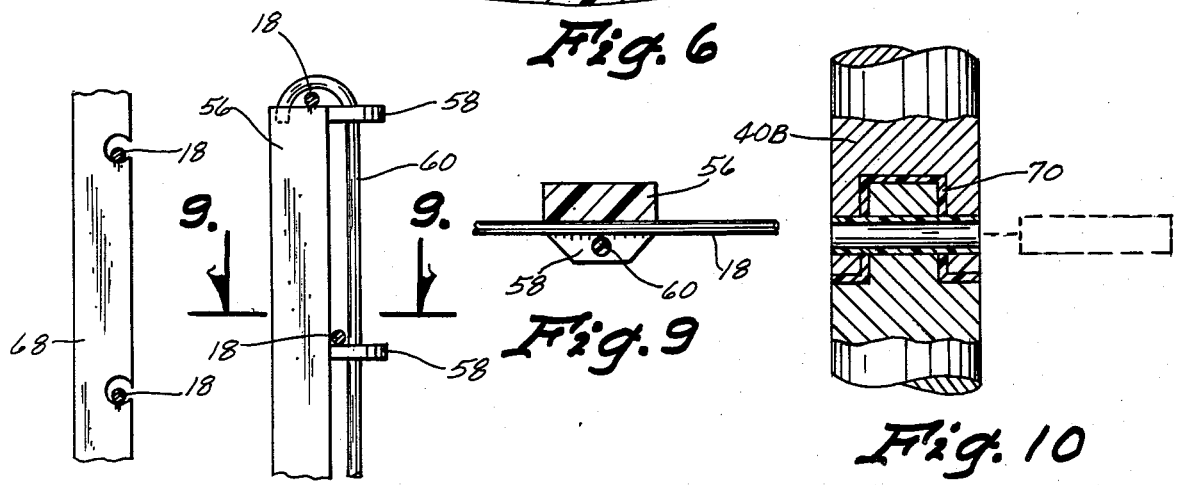
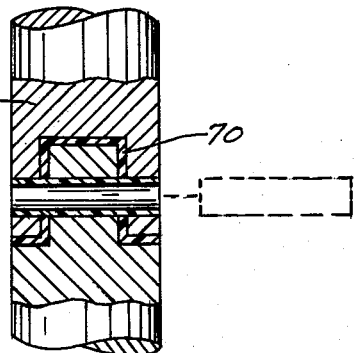
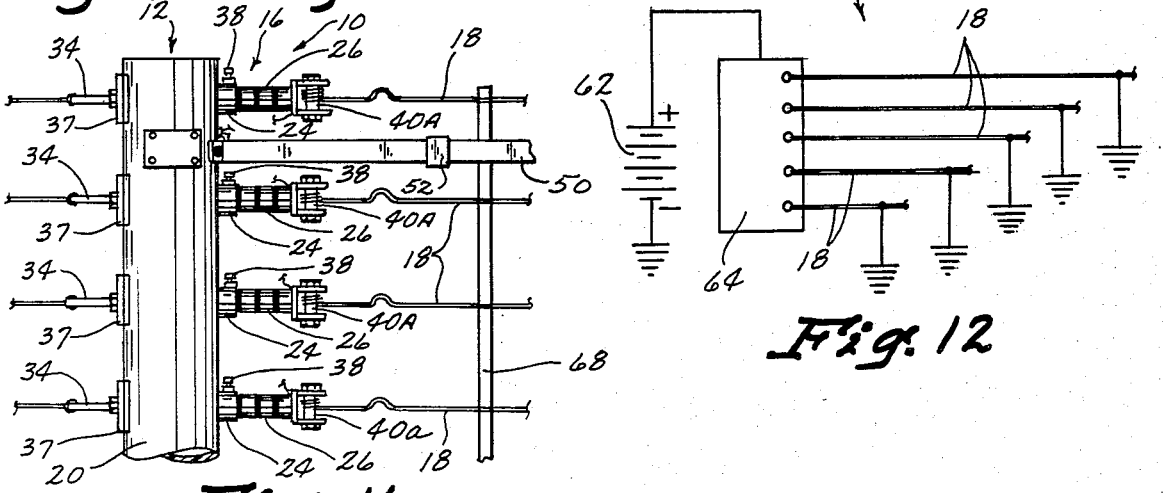

FENCING DEVICE

BACKGROUND OF THE INVENTION

The present invention relates to fencing devices and more particularly to a fence post incorporating wire tightening apparatus wherein a pre-established tension may be applied to the fence and maintained consistently under changing enviromental conditions.

The conventional fencing art generally includes a series of posts set in the ground with the wire or wire mesh attached to each individual post utilizing wire staples. There are many inherent problems associated with the conventional mode of fencing including inexact and uneven tension applied to the material, fencing material yielding little when pressured by livestock resulting in snapped wire, pulled staples and sagging wires. These conditions all lead to general deteriation of the fence and the present invention sets forth a satisfactory solution. Further the present invention is adaptable to be electrified while still overcoming the problems associated with the prior art.

SUMMARY OF THE INVENTION

The apparatus of the present invention overcomes the many disadvantages and difficulties described above and provides a simple and more reliable and endurable fencing device. In accordance with the present invention there is provided a post having concentric flanges extending outwardly on its bottom portion, which portion is inserted into the ground. In a single wire fence, a turning rod passing through a yoke with the wire wrapped around the turning rod forms the wire stretching device. As the turning rod is rotated the slack in the wire is removed and the tension on a strand of wire is increased to a predetermined level. A locking device prevents the turning rod from rotating once the tension is set on the wire. In fencing material utilizing more than one wire, several wire stretching devices may be stacked on top of each other with the bottom portion of the turning rod slipping over the top of the lower turning rod in a slip joint configuration. A tensioning unit connects the stretching device to the post and includes a first and second sleeve. The second sleeve being generally disposed within the first sleeve with a resilient element attached to the second sleeve and adjustably attached to the first sleeve. The end of the second sleeve is secured to the wire stretching device and the first sleeve is attached to the post. The end of the resilient element which is adjustably connected to the first sleeve includes a tension meter between the adjustable connection and the resilient element which through visual observation symbolically represents the amount of tension on the wire as the adjustable connection is manipulated to provide the correct tension on the wire.

An object of the present invention is the provision of a fencing device wherein the exact and uniform tension is applied to the fencing material.

Another object of the invention is the provision of a fencing device which is adapted to be installed by machine without excessive manual labor.

Still another object of the invention is the provision of a fencing device which is adaptable to be electrified.

Other objects, advantages, and novel features of the present invention will become apparent from the following detailed description of the invention when considered in conjunction with the accompanying drawings.

BRIEF DESCRIPTION OF THE DRAWINGS

FIG. 1 a typical fence arrangement utilizing the fencing device of this invention for a field;

FIG. 2 illustrates a typical corner section of a fence utilizing the present invention;

FIG. 3 is a cross-sectional view taken along lines 3—3 of FIG. 2 illustrating a corner post and brace post of the present invention;

FIG. 4 is a side view taken along lines 4—4 of FIG. 2;

FIG. 5 is a cross-sectional view taken along lines 5—5 of FIG. 2;

FIG. 6 is a partial cut away cross-sectional view taken along lines 6—6 of FIG. 2;

FIG. 7 is a partial side view taken along lines 7—7 of FIG. 3;

FIG. 8 is a side view illustrating a field post of the present invention;

FIG. 9 is a cross-sectional view along lines 9—9 of FIG. 8;

FIG. 10 is a partial cross-sectional view of the sectional turning rod of the present rod;

FIG. 11 is a partial side view of an embodiment of the present invention utilizing separate turning rods;

FIG. 12 is a schematic illustrating a possible embodiment of a electrical system for electrifying the wire fencing material of the present invention.

DESCRIPTION OF THE PREFERRED EMBODIMENT

Referring now to the drawings wherein like reference numerals designate identical or corresponding parts throughout the several views, FIG. 3 illustrates a fencing device 10 constructed according to the present invention.

As illustrated in FIGS. 3 and 6, the fencing device 10 includes a post 12 extending out of the ground which is adapted to hold a tensioning unit 14 and a wire stretching device 16 between wire fence material 18 and the post 12.

Specifically, the post 12 (FIGS. 3, 6, and 11) may be of conventional design of a wood product or as illustrated in the drawings may be mold formed having an exterior casing 20. The bottom portion of the post 12 includes coincentric flanges 22 with their bottom portion extending outward from the casing 20 of the post 12. After the post 12 has been set in the ground, the flanges 22 prevent the post 12 from working loose and ultimately out of the post hole.

The tensioning unit 14 (FIGS. 3 and 6) includes a first sleeve 24 and a second sleeve 26 with the second sleeve 26 being generally disposed within the first sleeve 24. A pull type resilient element 28 is connected to the first sleeve 24 at one end and to an adjustable element 30 at the opposite end. The adjustable element 30 controls the tension on the wire fence 18 and includes a bar 32 to which one end of the resilient element 28 is attached with a threaded stock section 34 extending out of the opposite end of the bar 32. The threaded stock section 34 extends beyond the exterior wall of the post 12 with a nut 36 thereon which is rotated above the stock 34 thus moving the adjustable element 30 laterally with respect to the longitudinal axis of the post 12 and adjusting the tension on the resilient element 28. The bar 32 may be color coded along its longitudinal axis to provide representations relative to the amount of tension being exerted by the resilient element 28. In some instances a plate 37 may be placed directly behind the nut 36 onto which the nut rests.

A lock nut 38 on the first sleeve 24 is provided which physically contacts the second sleeve 26 and prevents its movement with respect to the first sleeve 24. This will in essence remove the effect of the tensioning unit 14 on the wire fence 18 until all other adjustments have been completed.

The wire stretching device 16, (FIGS. 3 and 6) includes a turning rod 40 parallel to the longitudinal axis of the post 12 and passing through yokes 42. The yokes 42 are attached to the end of the second sleeve 26 extending out of the first sleeve 24. The fence material 18 passes through an aperture 44 in the turning rod 40 as the turning rod is rotated thus removing any slack in the wire 18 as the wire 18 is wrapped around the outside circumference of the turning rod 40. The correct tension on the fence material 18 may be set by torquing the rod 40 to the predetermined level.

A lock nut assembly 46 passes through one of each pair of the yokes 42 and when the turning rod 40 has been tightened to set the proper tension on the wire 18, the lock nut 46 is tightened down against the turning rod 40 thus preventing it from rotating and reducing the tension on the wire fence material 18.

As illustrated in FIGS. 2 and 3 in the typical embodiment, a brace post 48 will be positioned at a pre-selected distance from the post 12 with braces 50 extending there between at the top and bottom of each of the respective posts 12 and 48. Center straps 52 (FIG. 5) on each brace prevents the braces 50 from bowing in the center. The brace post 48 is of the same typical design as the post 12, and normally would include flanges 22 for anchoring the post in the ground. The wire fence material 18 (FIG. 9) passes through apertures in the side of the post 48 with the top wire passing along the upper portion of the post 48 and held in place by guides 54.

In standard field posts 56 (FIGS. 4, 8 and 9) the field side of the post would be flattened with guides 58 extending therefrom for the fence material 18 to rest thereon. A rod 60 would extend through each guide 58 from the field side of the wire 18 to lock the wire between the rod 60 and the post 56. The upper portion of the rod would be curved so as the end would contact the opposite side of the top of the posts 56 to hold the top wire of the fencing material 18 on top of the post 56.

The fencing device 10 is readily adaptable for use as an electrified fence as illustrated in FIG. 6, a cut out portion of the post 12 houses the batteries 62 and coil 64 with lines going to each separate wire (FIG. 3) of the fence material 18. A schematic 66 (FIG. 12) illustrates a typical circuit and is readily known in the art.

A spacer 68 (FIGS. 2, 3, 7, & 11) slips over the individual wires of the fencing material 18 and may be useful to prevent the individual wires of the fencing material 18 from separating.

In embodiments where individual wires are strung for the fencing material 18, the turning rod 40 must enable each separate wire of the fencing material 18 to be properly tensioned. This may be accomplished by utilizing spearate turning rods 40A (FIG. 11) for each separate wire or a sectional turning rod 40B (FIGS. 6 & 10) wherein the bottom most sectional turning rod 40B (FIG. 3) would be tightened to the correct torque pressure to get the proper tension on the wire, then the lock nut assembly 46 is tightened to prevent the rod 40B from rotating. A second rod 40B on the next yoke 42 is inserted and tightened as above and as illustrated in FIG. 10 a plastic insulating sleeve 70 interconnects both of the rods 40B. This process continues until all the rods 40B have been inserted and the individual wires of the fencing material 18 are placed under the proper tension. At this time the tensioning device 14 would be adjusted according to the wire specifications. As illustrated in FIG. 1 the typical fencing arrangement allows constant even pull on the fencing material 18 in the same direction which would generally add to the life of the fence in general.

The posts 12 and 48 are adaptable to be set into the ground with automated equipment wherein depending on the soil composition, prior digging of a post hole may not be required. A post thus set would generally be much more stable and naturally require less work in building a fence.

Obviously, many modifications and variations of the present invention are possible in light of the above teachings. It is therefore to be understood that, within the scope of the appended claims, the invention may be practiced otherwise than as specifically described.

I claim:

1. A fencing system for securing a fence of the type having wires, including setting and maintaining the wires at a predetermined tension, comprising:
   a first post having a bottom portion extending into the ground for rigidly fixing said post in one location;
   a wire stretching device for stretching the wire, having turning rods and yokes, the rods passing through the yokes and wire wrapped there around as the rod is rotated to stretch the wire and a locking device, said locking device preventing the rod from rotating;
   a tensioning unit connecting the stretching device to the first post including a first and second sleeve, the second sleeve being generally disposed within the first sleeve, and a spring, said spring at one end being adjustably connected to the first sleeve and connected to the second sleeve at its opposite end;
   at least one field post, said field post having a bottom portion extending into the ground and being generally spaced away from the first post along the run of the wire having one side thereof flattened along its longitudinal axis in juxtaposition with the wire, and guides, said guides extending outward from the flattened side of the field post underneath the wire and a rod, said rod extending downward through the guides and including a semicircular top portion extending onto the top of the post with the wire positioned between the post and the rod; and
   a third post having a bottom portion extending into the ground, said third post being positioned at the opposite end of the wire as is the first post and onto which is securely connected the wire.

2. A fencing system as claimed in claim 1 further including a brace post, said brace post located between the first post and the field post having a portion extending into the ground and a brace, the brace connected to the first post and the brace post to rigidly interconnect said post together, said wires extending between the first post and the field post passing through the brace post and wire guides, said guides holding the uppermost wire on top of the brace post.

* * * * *